United States Patent [19]

Byers

[11] 4,268,166
[45] May 19, 1981

[54] APPARATUS AND METHOD FOR MODIFYING IMAGES ON PHOTOGRAPHIC FILM

[76] Inventor: Thomas L. Byers, 3000 SW. 60, Oklahoma City, Okla. 73159

[21] Appl. No.: 5,617

[22] Filed: Jan. 22, 1979

[51] Int. Cl.³ .............................................. G03B 27/10
[52] U.S. Cl. ...................................... 355/84; 355/103; 355/52
[58] Field of Search .................................... 355/50–52, 355/77, 78, 84, 95, 132, 72, 79, 133, 103, 40, 80, 81

[56] References Cited

U.S. PATENT DOCUMENTS

| | | | |
|---|---|---|---|
| 2,286,883 | 6/1942 | Weber | 355/133 |
| 3,264,106 | 8/1966 | Alldis | 355/79 X |
| 3,445,165 | 5/1969 | Dubbs | 355/84 |
| 3,449,048 | 6/1969 | Allison | 355/95 X |
| 3,743,415 | 7/1973 | Gilman | 355/52 |
| 3,767,301 | 10/1973 | Solo | 355/52 |
| 3,927,942 | 12/1975 | Byers | 355/84 |
| 4,105,328 | 8/1978 | Wasson et al. | 355/52 X |

Primary Examiner—L. T. Hix
Assistant Examiner—W. J. Brady
Attorney, Agent, or Firm—Robert K. Rhea

[57] ABSTRACT

A photographic exposure apparatus and method for preparing production artwork of an image to be reproduced by photoengraving. The apparatus includes a movable panel superposed on a stationary plate for supporting a film containing an image to be reproduced in contiguous contact with a light sensitive sheet superposed on the stationary plate. Film registration indicators at least on the stationary plate permit successive identical registration of the film and at least one light sensitive sheet. An orbital motion guide and a linear motion guide, separately connected with driving motors and separately connected with the film support panel, are selectively manually adjusted and the respective motor energized for moving the film support panel in a predetermined path of predetermined magnitude during exposure of the image on the light sensitive sheet.

In an alternative embodiment, the image is projected on the light sensitive sheet when attached to the film support panel by an overhead projector.

7 Claims, 60 Drawing Figures

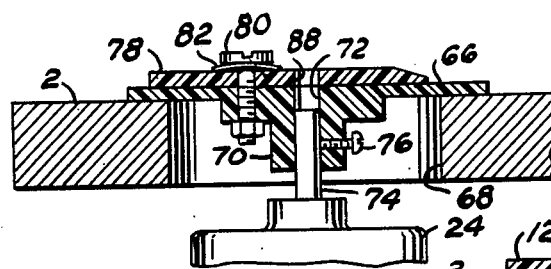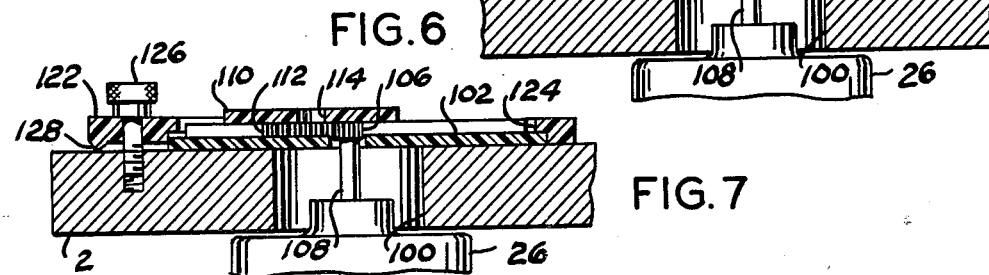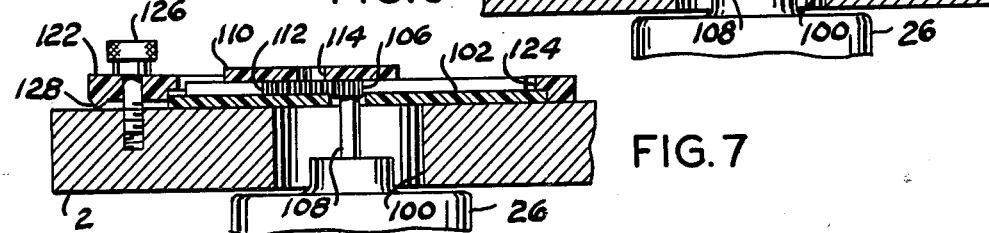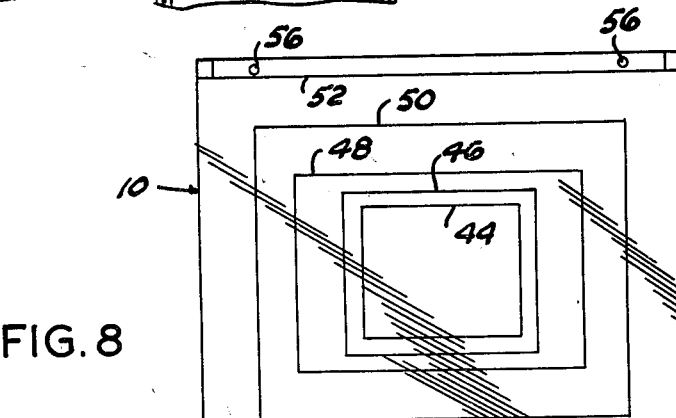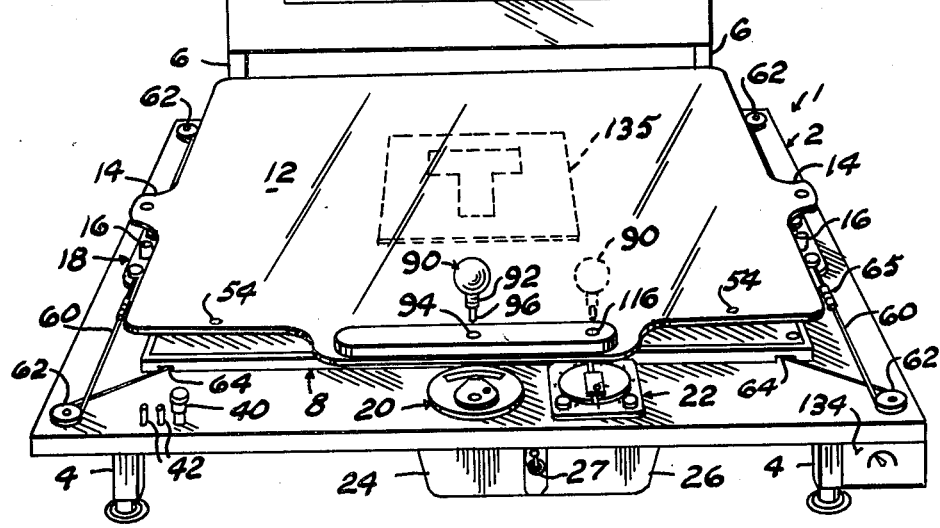

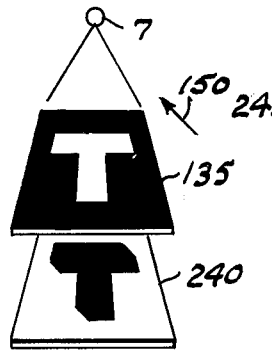
FIG.49
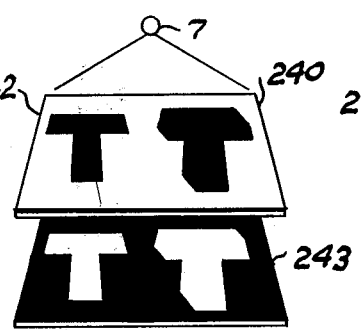
FIG.50
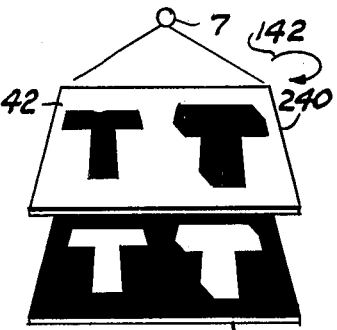
FIG.51
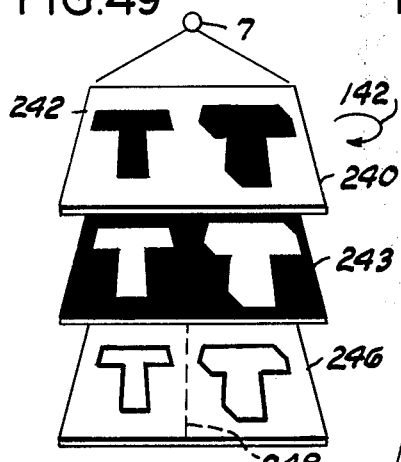
FIG.52
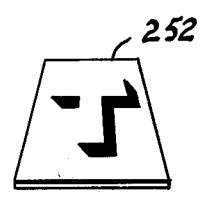
FIG.53
FIG.54
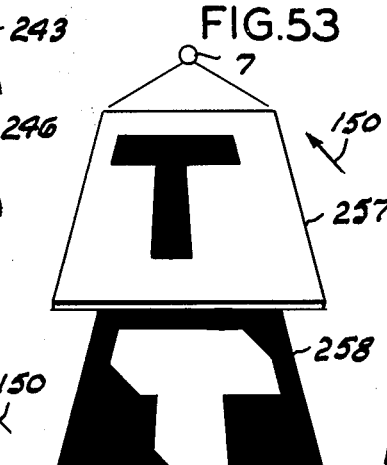
FIG.56
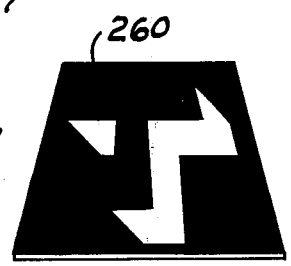
FIG.57
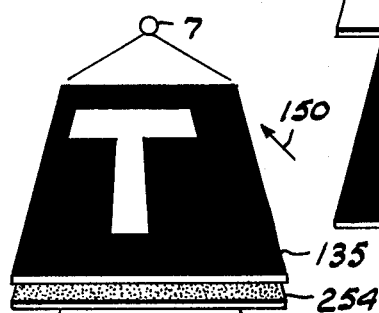
FIG.55
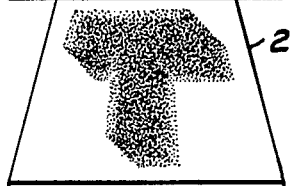
FIG.58
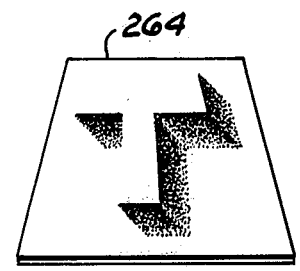
FIG.59

APPARATUS AND METHOD FOR MODIFYING IMAGES ON PHOTOGRAPHIC FILM

TECHNICAL FIELD

The present invention relates to the preparation of reproducible artwork and more particularly to an apparatus and method for modifying images on photographic film.

In the graphic arts industry "camera ready" artwork of the image to be printed is necessary for presentation to the photographic stages of producing a lithographic plate or an engraving cut for subsequent printing. The artwork may be a design, a letter of a type font, a composition of letters or words or an entire type font. Two similar modifications frequently required are: "adding to" or "substracting from" a given amount of all defining edges of the image to be reproduced. Such modifications are commonly referred to as "swells, spreads, or plus images" or "shrinks, chokes, or minus images", respectively. Another version of the "adding to" modification of an image is creating a "shaded or shadow" area along selected edges of the image to obtain the illusion of three-dimensions. In modifying an image for reproduction, particularly where more than one printing plate is necessary to print the respective components of the image in different colors, it is essential that the artwork forming the camera ready copy be capable of meeting reproduction requirements to obtain accurate registration when one color plate is printed over another.

BACKGROUND ART

Prior art U.S. Pat. No. 3,927,942 provided a centrally apertured planar base plate for holding a sheet of unexposed photographic film thereon by a vacuum source and a cable guided overlying transparent sheet supporting a film containing an image to be reproduced and moved in an orbital or linear direction in unison with the transparent sheet relative to the unexposed film by a control knob mandrel manually inserted into and guided along a template supported by the base.

The principal disadvantage of the device disclosed by this patent is the manual operation which requires the operator to achieve smooth orbital or linear motion of the film containing the image when attempting to trace a template with a mandrel. Repeated consistent and uniform exposures are difficult to achieve by this prior art.

Other techniques presently used for obtaining modification of artwork images include handwork methods and light diffusion methods. The handwork method requires a high level of skill on the part of the workman and considerable time to obtain satisfactory results. The time factor is directly proportional to the number of images, such as letters forming words to be modified by hand. The light diffusion method is useful only for plus and minus images and is limited to a very small quantity of modification. Light diffusion is accomplished by interposing a clear film spacer between the image bearing film and an unexposed film. The exposing light is moved angularly around the films allowing the light to strike in at all angles to undercut the perimeter of the image forming a modified image on the exposed film. This method achieves approximately one-half millimeter undercut of the image for each exposure and additional exposures to obtain further undercuts results in loss of definition and a resulting poor quality of image. Further, when using this method of modification it is difficult to obtain identical and predictable results.

DISCLOSURE OF INVENTION

The present invention eliminates the inaccuracies of handwork or manually operated devices including a film holding vacuum source by providing an apparatus having selective adjustable guides for orbital or linear motion of the film and image being modified and further provides an accurate repeatable registration system for placement of image bearing film and an unexposed section of film with respect to each other.

A generally rectangular planar base is disposed in a photographic darkroom below a point light source controlled by a timing device. A planar face plate centrally overlies the base and its upper surface is scored with lines representing the outside dimensions of standard film sizes. Pairs of apertures, in the face plate, removably receive registration pins for successive identical registration of identical size film when placed on the face plate. An upright film carriage supporting panel, supported by the base, is provided with scored lines of identical size with respect to the film position scored lines on the face plate. A transparent planar film carriage panel is supported by the upright panel when receiving an image bearing film and is subsequently supported in contiguous overlying contact with the face plate and movable with respect thereto by a base supported film carriage panel support assembly comprising cables tautly entrained around pulleys and extending in crossed relation through suitable grooves formed in the depending surface of the face plate for maintaining the marginal edges of the face plate and film carriage parallel during movement of the film carriage.

A manually adjustable eccentric motion dial drive guide and a manually adjustable linear motion drive guide are mounted in juxtaposed relation on the base adjacent the face plate and respectively driven by motors mounted on the depending surface of the base for moving the film carriage relative to the face plate by a guide mandrel inserted through the film carriage and engaged with the eccentric dial or the linear drive.

The purpose of the eccentric dial is to uniformly increase or decrease the image on the film supported by the film carriage when exposed on an underlying photographic film wherein the amount of increase or decrease is determined by the manually adjustable radius of an orbital motion imparting dial drive guide. The purpose of the linear drive is to produce a uniform shadow image of the image on film supported by the film carriage when exposed on a sheet of underlying photographic film with the length of the shadow determined by a manually adjustable time exposure of a light source with the direction of the shadow being governed by the manual setting of the linear drive guide.

BRIEF DESCRIPTION OF THE DRAWINGS

FIGS. 5, 6 and 7 are vertical cross sectional views taken substantially along the lines 5—5, 6—6 and 7—7, respectively, of FIG. 4;

FIG. 8 is a perspective view of the apparatus illustrating the carriage sheet and guide mandrel in position to be disposed in overlying contact with the face plate and illustrating, by dotted lines, the relative position of the film supported by the underside of the film carriage and an alternative position for the guide mandrel;

FIGS. 49, 50, 51, 52, 53 and 54 are perspective views of film illustrating the method of forming inlined letters with inline shadow areas and split images for the letter and shadow areas of a type character;

FIGS. 55, 56, 57, 58 and 59 are perspective views, to a larger scale, illustrating the method of forming shadow areas of a type character to simulate an air brush graduated tone; and, FIG. 60 is a perspective illustrating a film image projection method of using the apparatus.

THE BEST MODE FOR CARRYING OUT THE INVENTION

Figure 9:
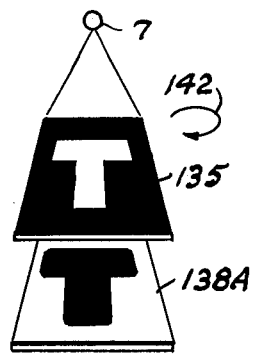
FIGS. 9, 10 and 11 are exploded perspective views of film illustrating the three basic functions of the apparatus.
Figure 10:
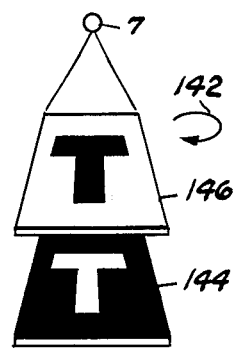
Figure 11:
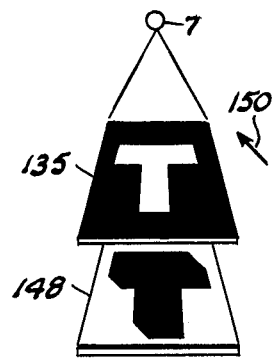

In the drawings, referring more particularly to FIGS. 1 through 8, the apparatus 1 includes a rectangular horizontally disposed planar base 2 supported by forward legs 4 and back legs 6 and located in a photographic darkroom, not shown, below a manually adjustable point light source 7 (FIGS. 9, 10 and 11). A fixed position planar face plate 8 centrally overlies the upper surface of the base 2.

The rearward base legs 6 are extended vertically upward in parallel relation a distance at least equal to the greatest transverse dimension of the face plate 8 and are transversely interconnected by a back copy board 10 of substantially equal overall dimension with respect to the face plate 8. A film carriage panel 12, formed from transparent sheet material, having overall dimensions slightly greater than the overall dimensions of the face plate 8, is provided with opposing laterally directed centrally apertured ears 14. The ear apertures receive a pair of upstanding pins 16 forming part of a carriage float assembly 18 for moving the film carriage 12, as presently explained.

An eccentric motion dial guide 20 and a linear motion drive guide mechanism 22 are mounted in juxtaposed relation on the upper surface of the base 2 and respectively driven by motors 24 and 26 mounted on the depending surface of the base 2 and controlled by a switch 27.

The upper surface of the face plate 8 is scored or printed with a plurality of endless lines forming rectangular areas 28, 30, 32, 34 and 36 of increasing size respectively indicating overall dimensions of standard size photographic film sheets capable of being individually secured in overlying relation on the upper surface of the face plate. A plurality of 6 mm diameter registration pin receiving holes 38 are formed in the upper surface of the face plate adjacent the respective right hand forwardly disposed corner, as viewed in the drawings, of the respective scribed box area 28 through 36. A plurality of companion registration pin receiving holes 39, each dimensioned for receiving a 3 mm diameter taper registration pin, one for each of the registration pin holes 38, are formed in the surface of the face plate adjacent the forwardmost line and near the left hand forward corner, as viewed in the drawings, of the respective scored box area 28 through 36 for identical registration of photographic film disposed on the upper surface of the face plate 8 as presently explained in more detail. This photographic film registration system is designed for using film sizes of 8 inches × 10 inches (20.32cm × 25.40cm) and larger. Smaller size film cannot be registered on the face plate.

Film registration pins 40 and 42 are normally supported by suitable apertures in the base 2 and are dimensioned to be removably received by the respective pairs of registration holes 38 and 39 when registering film on the face plate 8, as presently explained.

Figure 1:
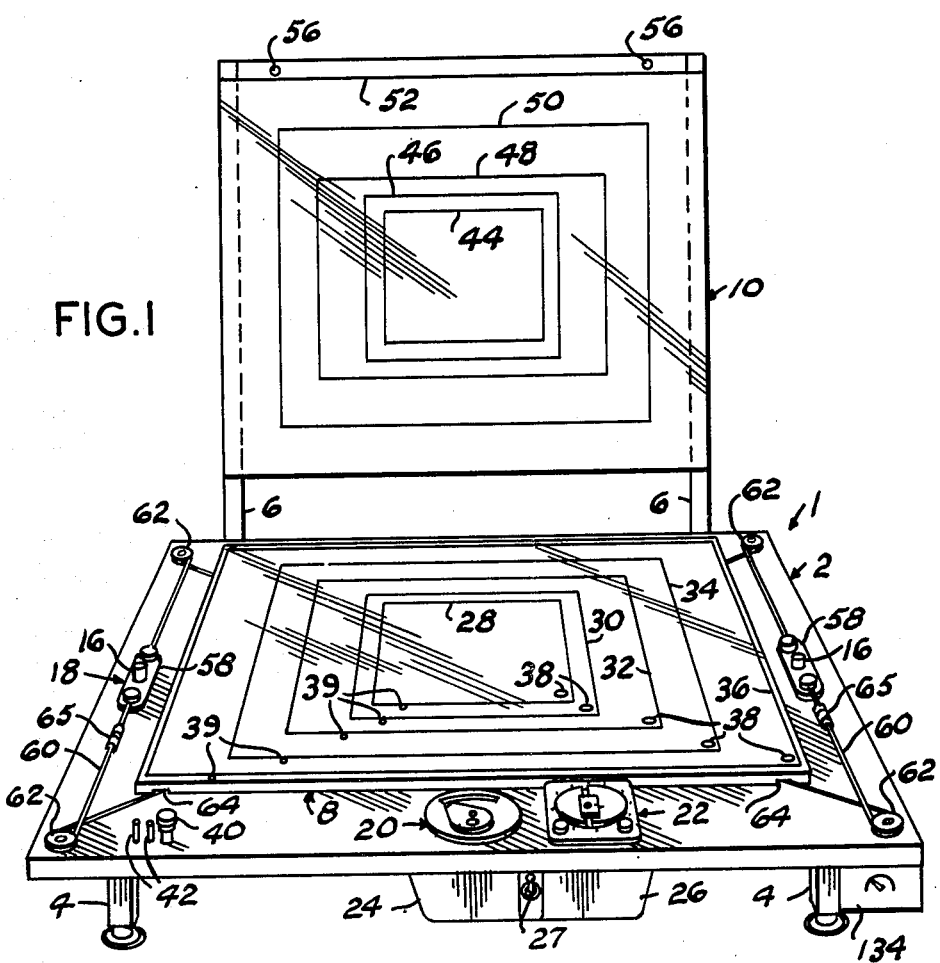
FIG. 1 is a perspective view of the major portion of the apparatus.
Figure 2:
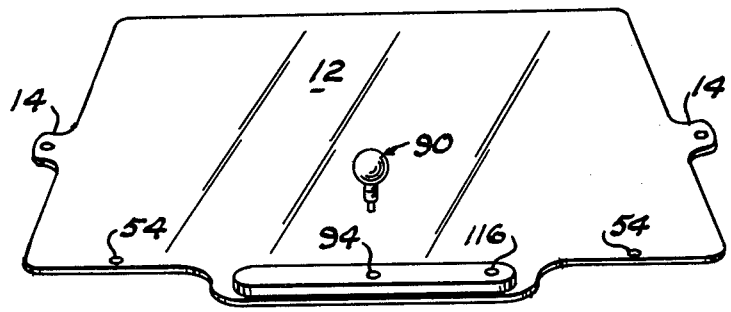
FIG. 2 is a perspective view of the movable film carriage panel illustrating the motion guide mandrel in exploded relation.
Figure 3:
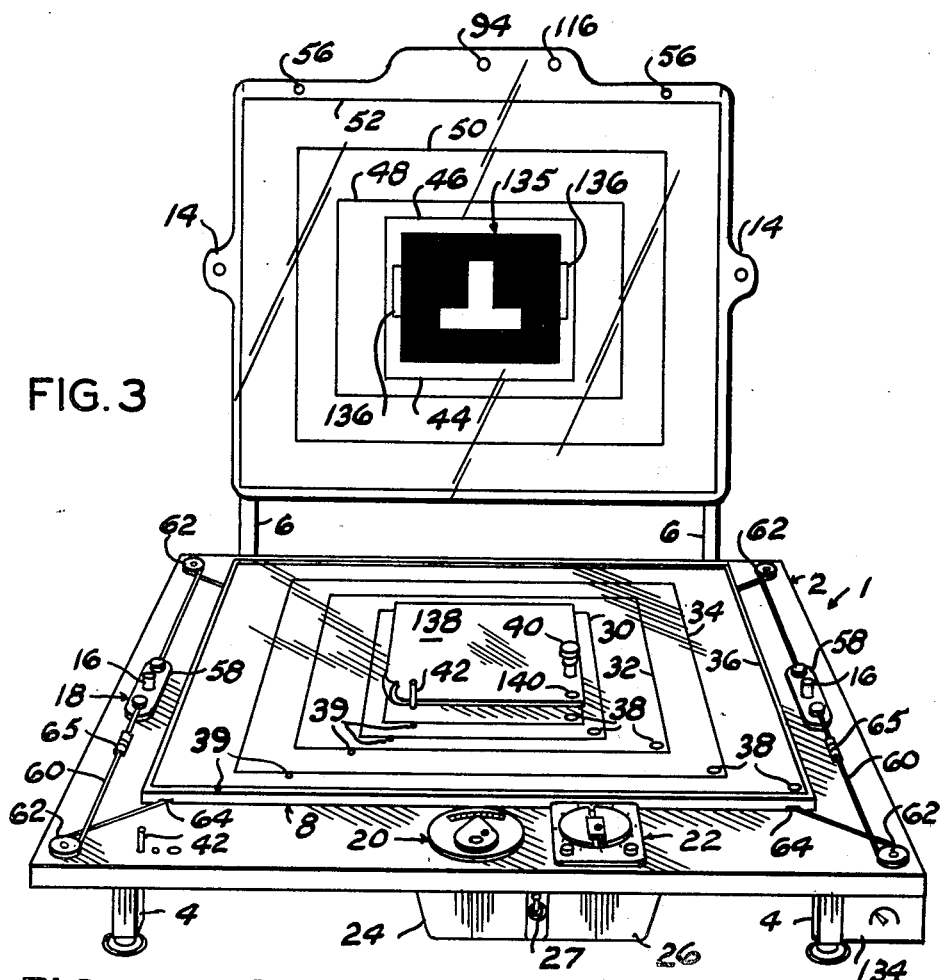
FIG. 3 is a perspective view similar to FIG. 1 illustrating the manner of positioning film on the apparatus.
Figure 4:
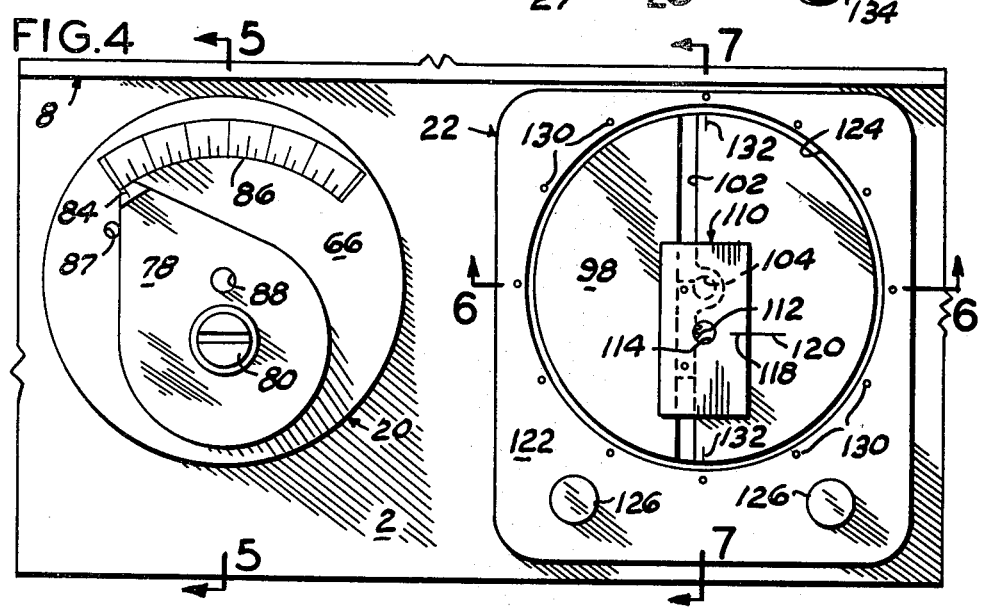
FIG. 4 is a fragmentary top view, to a larger scale, of a portion of the base illustrating the position of the eccentric dial and linear motion drives.

The forward surface of the back board 10 is similarly scored or printed with endless lines forming closed box areas 44, 46, 48, 50 and 52 indicating overall film dimensions of identical area with respect to the box areas 28 through 36 for placement of film on the film carriage 12. The film carriage 12 is further provided with a pair of holes 54 adjacent its forward edge, as viewed in FIG. 2, which receive a pair of cooperating pins 56 adjacent the upper limit of the back board 10 for supporting the film carriage thereon, as shown by FIG. 3.

The carriage float assembly 18 comprises a pair of links 58 disposed on the upper surface of the base lateral marginal edge portions in transversely aligned relation and are connected at their respective ends with a pair of cables 60 entrained around four pulleys 62 journalled by the respective corner portions of the base 2 and extending in crossed relation under the face plate 8 through suitable grooves 64 formed in its depending surface. The purpose of the carriage float assembly 18 is to guide the film carriage 12 when overlying the face plate 8 and moved relative thereto wherein the float assembly maintains the marginal edges of the film carriage 12 parallel with respect to the adjacent marginal edges of the face plate 8 for the purposes presently apparent. Desired cable tension is maintained by turnbuckles 65.

The eccentric dial motion guide 20 comprises a relatively thin planar disk 66 flatly overlying the upper surface of the base 2 in surrounding relation with respect to an opening 68 therein. The disk 66 is provided with an integral step diameter boss 70 projecting into the opening 68 and having a central aperture 72 which receives the drive shaft 74 of the motor 24. The boss 70 is secured to the motor drive shaft by a set screw 76 so that the motor, when energized, angularly rotates the disk 66 relative to the base 2. A teardrop-shaped planar dial pointer 78 overlies the disk 66 and is secured thereto by a bolt and nut 80 projecting through a portion of the boss 70 in off-set relation with respect to the boss aperture 72. A spring washer 82 is interposed between the head of the bolt 80 and the adjacent surface of the dial pointer 78 for adjusting the coefficient of sliding friction between the dial pointer 78 and disk 66 to maintain the dial pointer in a selected position. The converging end of the dial pointer 78 is scored with an indicator line 84 for alignment with a row of scale calibrations 86 scored on the surface of the disk 66. The scale 86 indicates units of measurement governing the increase or decrease in size of type characters being reproduced by the apparatus, as presently explained.

The disk 66 is provided with a tapered aperture 87 for receiving one of the tapered register pins 42 and calibrating the dial pointer 78 to zero. The dial pointer 78 is further provided with an aperture 88 coaxially aligned with the boss aperture 72, when the pointer 78 is set at zero for receiving a guide mandrel 90. The guide mandrel 90 includes a threaded portion 92 which engages a dial guide threaded aperture 94, formed in a reinforced forward marginal extension on the carriage plate 12, when the latter is flatly disposed on the face plate 8. An axial pin portion 96 of the guide mandrel projects through the film carriage 12 and enters the pointer aperture 88 for the purposes presently explained.

The linear drive mechanism 22 comprises a centrally bored 360° rotatable disk-like pivot plate 98 having a rabbeted circumferential edge flatly overlying the upper surface of the base 2 in surrounding relation with respect to an opening 100 in the base. The pivot plate 98 is provided with a diametric groove 102 in its upper surface, as viewed in the drawings, which communicates, medially its ends, with a lateral recess 104 loosely surrounding a pinion 106 on the end of the drive shaft 108 of the motor 26. A linear drive slider 110, of rectangular flat configuration, transversely spans and longitudinally overlies an intermediate portion of the pivot plate groove 102. The slider is provided, intermediate its ends, with a depending rack 112 slidable in the groove 102 and having its teeth cooperatively engaged with the pinion 106 for movement of the slider 100 longitudinally of the slot 102 when the motor 26 is energized. The slider 110 is provided with a central aperture 114 for receiving the guide mandrel pin 96 when the mandrel is inserted through a linear guide opening 116 formed in the reinforced extension of the film carriage 12 for the purposes presently explained.

Slider starting lines 118 and 120 are respectively scored on the upper surfaces of the slider 110 and pivot plate 98 for the purposes of setting the slider to a zero or starting position, as presently explained.

A generally rectangular clamp plate 122, having a central aperture 124 defined by a rabbeted edge cooperating with the rabbeted edge of the pivot plate 98, overlies the latter in surrounding relation and is secured to the upper surface of the base 2 by a pair of clamp bolts 126. The clamp plate 122 is provided with a depending lug 128 adjacent its marginal edge containing the clamp screws 126 to bias the opposite marginal edge portion of the clamp plate toward the pivot plate 98 and impinge it against the base 2 to maintain the pivot plate in a selected angular position. The top surface of the clamp plate 122 is provided with a circumferentially spaced row of dots 130 surrounding its central aperture 124 indicating the hour positions of a clock face. Diametrically opposite position lines 132, scored on the upper surface of the pivot plate 98 are aligned with a selected pair of the dots 130 for movement of the film carriage 12 in a selected direction, as presently explained.

A conventional timer and light intensity control 134, disposed adjacent the base 2, connects the light source 7 with a source of electrical energy, not shown.

In FIGS. 9 through 59, the apparatus 1 has been omitted for simplicity and the majority of the photographic films illustrated, in exploded perspective, as they would appear when attached to the apparatus. A type character is illustrated as an example of the image to be modified, however, any image can be modified in the manner presently described.

Definition of the photographic terms used hereinafter are as follows:

Original copy—the original image of a type character to be modified;

Negative—where the image of a type character is clear on an opaque film;

Positive—where the image of a type character is opaque on a clear film;

Plus image—a modified film image produced by orbital motion of the apparatus from a negative of original copy wherein a uniform amount of image area has been added to all defining edges of the image on the negative;

Minus image—a modified film image produced by orbital motion of the apparatus from a positive of the original copy wherein a uniform amount of image area has been subtracted from all defining edges of the image on the positive;

Smear image—a uniformly smudged film image (used in forming a shadow area) produced by a predetermined linear motion direction of the apparatus from a negative of the original copy, wherein the film image is extended in a shadow forming direction;

Split image—an intermediate plus image (to split an outline) or an intermediate minus image (to split an inline) to be used as a color trapping.

In practicing the invention and referring more particularly to FIGS. 3, 8 and 9, obtain a negative 135 containing the image of the type character to be modified and attach this negative, by tape 136, to the central box area 44 of the forward surface of the film carriage 12 when supported by the back board 10 when the position of the type character inverted, as it appears in FIG. 3, and with the emulsion side of the negative facing away from the film carriage. Obtain a similar size section of unexposed film 138 and with the emulsion side up punch a 6 mm hole 140 in the lower right hand corner of the film, as viewed in FIG. 3, approximately 12 mm from each adjacent edge of the film. Place the film 138 emulsion side up on the central box area 28 of the face plate 8 and insert the register pin 40 through the adjacent hole 140 and into the receiving hole 38 in the face plate 8. Then insert one of the taper pins 42 into the cooperating receiving hole 39 in the face plate 8 and pivot the film 138 about the axis of the register pin 40 to contact the taper pin 42 being sure that the film 138 remains flat but with its edge in contact with the taper pin 39 and tape the unexposed film 138 to the surface of the face plate 8 before removing both register pins 40 and 42.

Manually set the eccentric dial pointer 78, hereinafter called "dial", so that its indicator line 84 is aligned with a selected one of the scale lines 86. This places the dial aperture 88 in an eccentric position with respect to the axis of the motor shaft 74. For example, if the dial is set for 2 mm the image of the type character will have 2 mm added to all sides of the negative image when exposed on the film 138. Set the timer and light intensity control 134 for the proper exposure of the film 138. The desired light intensity and exposure time is predetermined, by trial and error, in accordance with the film being used. The preferred film for excellent results is Kodalith MP Line Film marketed by Eastman Kodak Co., Rochester, New York 14650. The preferred exposure time in seconds and light intensity is preferably recorded on a chart, not shown, in order to quickly obtain identical film exposures for each operation of the apparatus. The film carriage 12 is removed from the back board 10 by manually grasping its ear portions 14 and placing it in overlying position on the face plate 8 with the apertures in the ears 14 surrounding the carriage float pins 16. The guide mandrel 90 is inserted into the carriage plate hole 94 with the guide pin portion 96 inserted into the dial pointer aperture 88. The motor 24 is energized by the switch 27 and substantially simultaneously the timer 134 is turned "on" with the motor being maintained energized until the light 7 turns "off". The motor 24, by rotating the dial disk 66, drives the film carriage 12 in an orbital direction, as shown by the curved arrow 142 (FIG. 9). When the light goes "off" the exposure of the film 138 is complete which is removed from the face plate 8 after again placing the film carriage 12 on the back board 10. The exposed film 138 is developed in a conventional manner which results in a positive plus image 138A. Positive plus images are used for color trappings for negative original copy and outlines and can be used to create outlines, as presently explained.

The minus image, as shown by the negative 144 (FIG. 10), is produced with the apparatus by using a positive 146 containing the type character. The positive 146 is similarly attached to the firm carriage 12 for exposing an undeveloped film similarly registered on the face plate 8 and by following the above described procedure for forming the plus imaage. The film carriage 12 and positive 146 are similarly moved in the orbital direction of the arrow 142 with the dial 78 set at the selected calibration for the minus image. For example, if the dial pointer 78 is set on the calibration for 2 mm the resulting character image on the negative 144 will be 2 mm smaller on all sides than the character on the positive 146. Minus images of original images are used for color trappings for positive original copy and inlines, and can be used to create inlines, as presently explained.

The smear image 148, as shown by FIG. 11, is usually produced from a negative of the original copy image, such as the negative 135. Placement of the negative 135 and film to be exposed is followed as described hereinabove up to the point of setting the motion control. The linear drive mechanism 22, hereinafter called "linear drive", is used to produce a smear image. The desired angle of the smear image or shadow for the original copy is selected by manually rotating the pivot plate 98 to align its position lines 132 with selected opposing dots 130. For example, the lines 132 may be aligned with the four O-clock and 10 O-clock positions of the clamp plate dots 130 after loosening the set screws 126 and again tightening them after setting the pivot plate.

The slider 110 is positioned with its starting scribed lines 118 and 120 in as near alignment as the rack teeth and pinion 106 permits and the control knob 90 is inserted through the film carriage aperture 116 to engage the slider hole 114. The motor 26 is started and simultaneously the timer and light source is energized so that the motor pinion 106, engaging the rack 112, moves the slider in the direction of the arrow 150 with the motor being operated until the light turns "off". The exposed film is then developed, as stated above, to form the positive 148. The length of the smear or shadow is determined by chosing the desired time exposure of the light source. Smear images are used to form shadows for any image, including type characters and may be outlined or inlined, as hereinafter described.

The three basic functions of the apparatus illustrated by FIGS. 9, 10 and 11, may be combined in a limitless variety of ways to achieve unique type face or copy modifications.

There is a direct and an indirect method for using the apparatus to produce outlines and inlines of type characters. The indirect method uses three pieces of film to progress from a negative of plain copy to a finished outline or inline of the type character while the direct method uses only one intermediate piece of film and is faster. However, the indirect method is useful when forming very thin outlines of type characters and is more accurate than the direct method and essential where the resulting finished images are printed in different colors or to obtain a white outline, as presently explained.

In the interest of brevity the description of the method followed and illustrated by FIGS. 12 through 59 omits the detailed description or operating the components of the apparatus 1 and the placing and registering of photographic film thereon, it being understood that the basic procedure described for FIGS. 9, 10 or 11 is followed.

Figure 12:
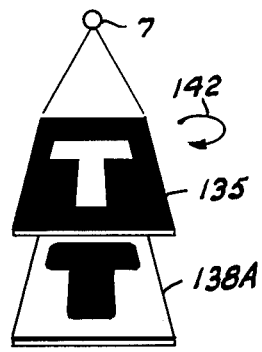
FIGS. 12, 13 and 14 are exploded perspective views of film illustrating an indirect method of forming an outline positive copy of a type character.
Figure 13:
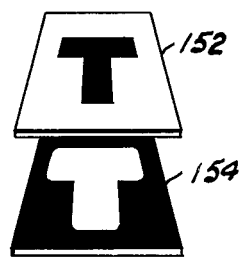
Figure 14:
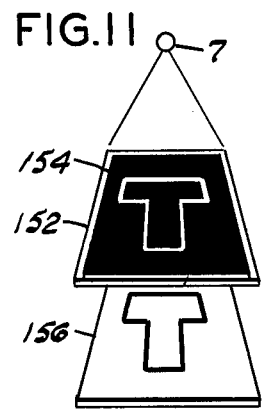

As shown by FIG. 12, the film negative 135 and an unexposed sheet of film are similarly placed, as described hereinabove for FIG. 9, on the apparatus 1 to produce the plus image 138A. A positive 152 is formed from the negative 135 as by using a sheet of negative acting film. Similarly a negative 154 is formed from the positive 138A and these two films 152 and 154 are taped together in contiguous superposed registered relation, as shown by FIG. 14, which form a clear outline area around the type character. The taped together sheets 152 and 154 are then contact printed to obtain an outline positive 156 of the type character.

Figure 15:
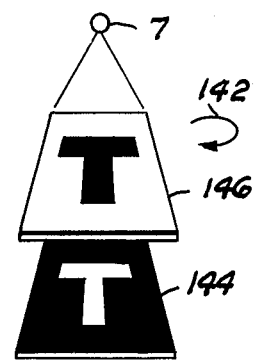
FIGS. 15, 16 and 17 are exploded perspective views of film illustrating an indirect method of forming an inline positive copy of a type character.

As shown by FIG. 15, the positive 146 is attached to the film carriage 12 over a sheet of unexposed film to obtain the minus image 144, in the manner described hereinabove for FIG. 10.

Figure 16:
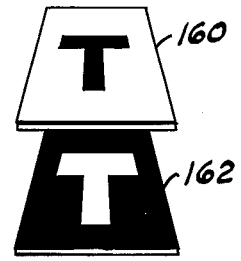
Figure 17:
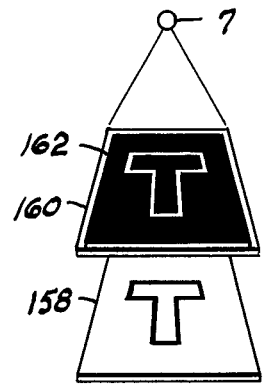

Using negative acting film a positive 160 and a negative 162 are printed from the minus image 144 and positive 146, respectively (FIG. 16). These two films 160 and 162 are then taped together in superposed registration, as shown by FIG. 17, to form a clear inline space around inside the type character. The taped together sheets 160 and 162 are then contact printed to obtain an inline positive 158 of the type character.

Figure 18:
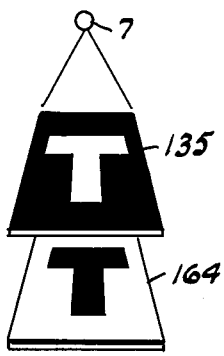
FIGS. 18, 19 and 20 are perspective views of film illustrating the method of forming an outline and split image of a type character.

Referring to FIG. 18, the negative 135 is taped to the film carriage 12 and with the dial 78 set at zero expose a section of film which, when developed, forms the positive 164.

Figure 19:
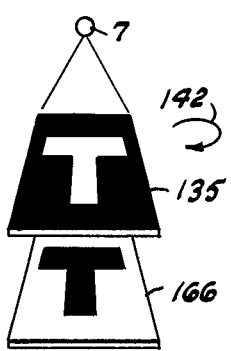

FIG. 19 illustrates an optional step in which the negative 135, taped to the film carriage 12, is exposed on a section of film with the eccentric dial 78 set for one-half of a desired outline thickness for the type character so that the exposed film when developed forms a split image 166.

Figure 20:
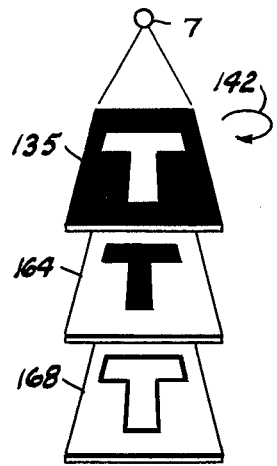

In FIG. 20, the positive 164 is placed in superposed registration with an unexposed film and with the dial 78 set for the desired outline thickness the negative 135 is exposed on the film which, when developed, forms the outline 168 of the type character.

Figure 21:
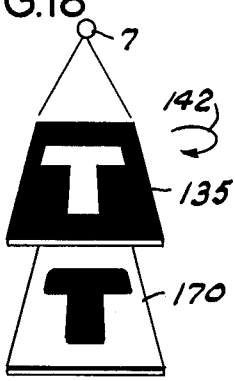
FIGS. 21, 22 and 23 are perspective views of film illustrating the method of forming a contour outline and a contour split image of a type character.

In FIG. 21, the negative 135 is exposed on a section of film with the dial 78 set for the inside edge of a desired contour line so that when the film is developed it forms the registered plus image 170.

Figure 22:
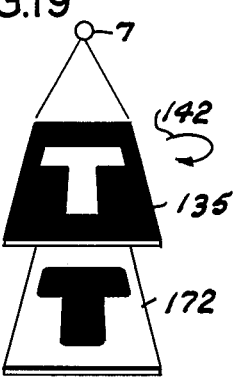
Figure 23:
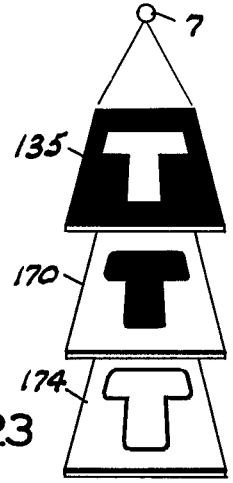

The optional step illustrated by FIG. 22, forms the positive contour split image 172 with the dial 78 set for the middle of the contour line.

The contour outline 174 is formed by taping the positive plus image 170 in register with a section of film and exposing the negative 135 on unexposed film with the dial 78 set for the outside edge of the type character contour line.

Figure 24:
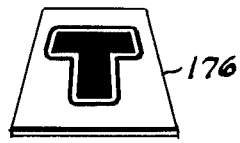
FIG. 24 is a perspective view of a film containing a combined contour outline and a split image of a type character.

The finished contour outline type character 176 of the type character illustrated by FIG. 24, is the result of double contact printing a positive, such as the film 164, in register with the contour outline 174. Films 164 and 174 may be used as finished artwork and reproduced in separate color.

Figure 25:
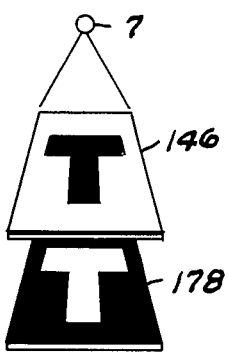
FIGS. 25, 26 and 27 are exploded perspective views of film illustrating a method of forming an inline and split image of a type character.

In FIG. 25, tape the positive 146 to the film carriage 12, set the dial at zero, expose and develope the registered negative 178.

Figure 26:
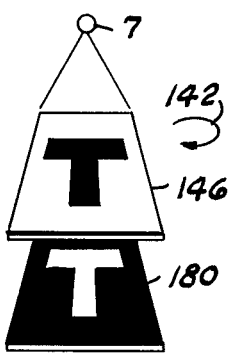

As optional steps, illustrated by FIG. 26, set the dial 78 for one-half of the inline thickness, expose and develope the split image 180.

For forming a contour fill of the type character set the dial twice the inline thickness and expose and develope another film section to create a contour inline, not shown.

Figure 27:
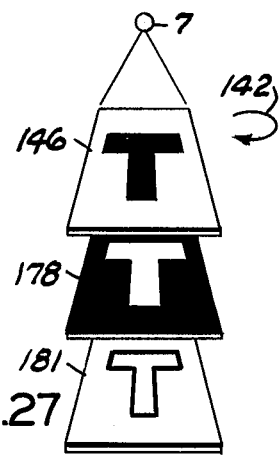

In FIG. 27, tape the negative 178 in register with a section of unexposed film, set the dial 78 for the desired inline thickness, expose the film which, when developed, forms an inline 181 of the type character.

Figure 28:
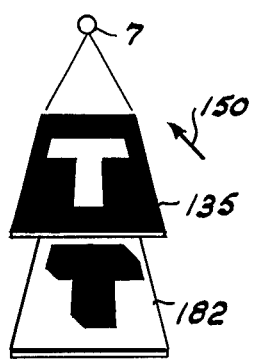
FIGS. 28 and 29 are exploded perspective views of film illustrating the method of forming a shadow area for a type character.
Figure 29:
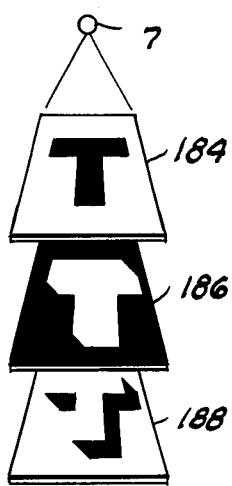

In FIG. 28, tape the negative 135 to the film carriage 12, set the linear drive 22 for the desired angle of smear, expose and develope the smear positive 182.

Contact print the negative 135 and the positive 182 to obtain the positive 184 and negative 186, respectively, then tape the positive 184 in register with the negative 186 with a halftone screen 185 interposed therebetween and contact print to obtain the type character shadow image 188.

Figure 30:
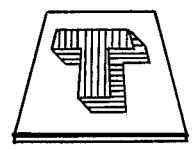
FIG. 30 is a perspective view of a type character and its shadow area when printed in different colors.

FIG. 30 illustrates the accurate registration obtained when printing the positive 184 in one color and the shadow image 188 in another color.

Figure 31:
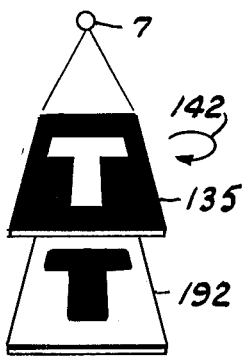
FIGS. 31, 32, 33 and 34 are exploded perspective views of film illustrating the method of forming a combined outline shadow area and split image of a type character.

In FIG. 31, tape the negative 135 to the film carriage 12, set the dial 78 for one-half the desired outline thickness, expose and develope the positive split image 192.

Figure 32:
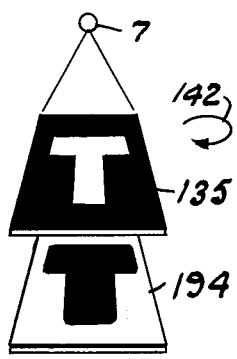
Figure 33:
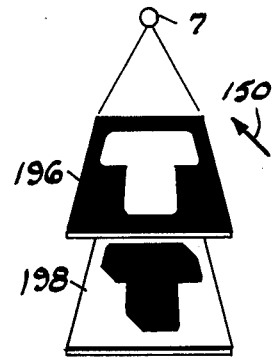
Figure 34:
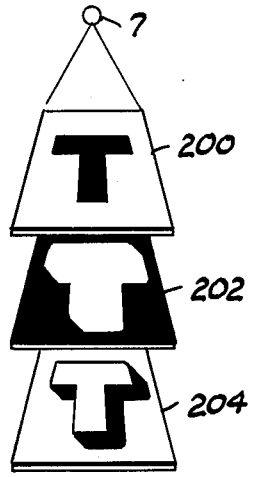

In FIG. 32, set the dial for the desired outline thickness, expose and develope the positive 194. Contact print the positive 194 to obtain the negative 196 which is taped to the carriage 12 and with the linear drive set at the desired angle, expose and develope the smear positive 198 (FIG. 33). Contact print the films 135 and 198 to obtain the positive 200 and negative 202, respectively. Tape the films 200 and 202 together in register and contact print to form the positive outline and shadow area of the type character, as illustrated by the film 204, when developed (FIG. 34).

Figure 35:
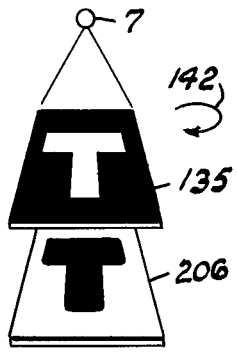
FIGS. 35, 36 and 37 are exploded perspective views of film illustrating the method of forming a contour outline with shadow and split image of a type character.
Figure 36:

In FIG. 35, tape the negative 135 to the film carriage 12, set the dial 78 for the inside edge of the desired contour line, expose and develope the plus positive 206. Contact print the plus positive 206 to form a plus negative, not shown, and follow the steps described for FIGS. 32, 33 and 34 to obtain the positive contour outline with shadow 208.

Figure 37:
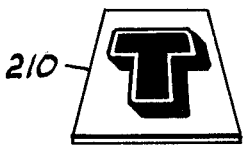
Figure 38:
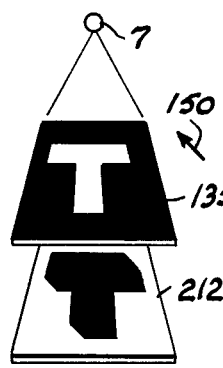
FIGS. 38, 39, 40, 41, 42 and 43 are exploded perspective views of film illustrating the method of forming an outlined character and outlined shadow and split image for the letter and shadow area of a type character.
Figure 39:
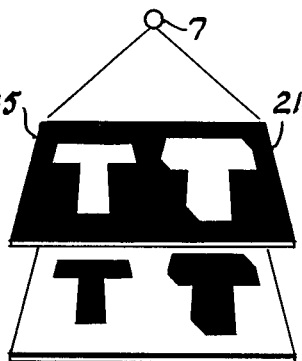
Figure 40:
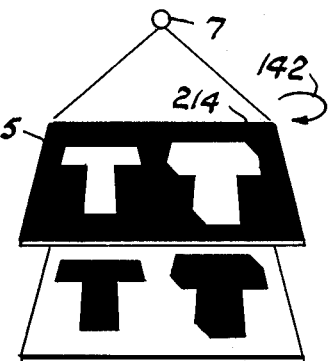
Figure 41:
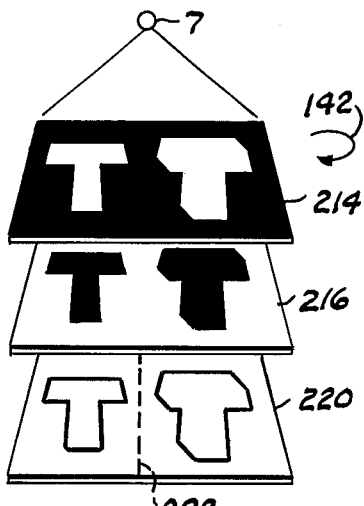
Figure 42:
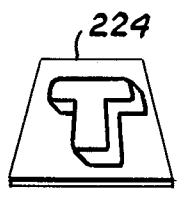
Figure 43:
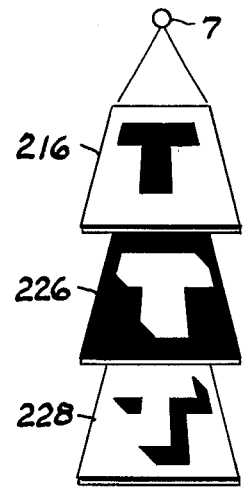
Figure 44:
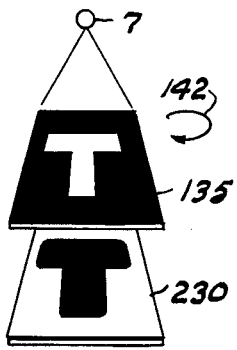
FIGS. 44, 45, 46, 47 and 48 are perspective views illustrating the method of forming continuous outlined letter and outlined shadow area and split images for the letter and shadow areas of a type character.
Figure 45:
Figure 46:
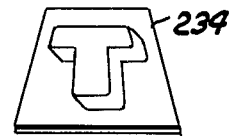
Figure 47:
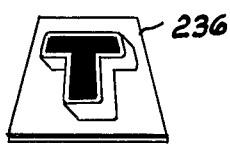

The film 210, shown by FIG. 37, illustrates the contour outline with shadow and original type character.

In FIGS. 38 to 43, tape the negative 135 to the film carriage 12, set the linear drive 22 for the desired angle and length of shadow area, expose and develope the film to obtain the positive smear 212 of the type character, contact print the positive 212 to obtain the type character smear negative 214.

Tape the negative 214 on the film carriage 12 in juxtaposed relation with the negative 135, set the dial 78 at zero and expose and develope the registered positive 216.

Set the dial 78 for one-half the desired outline thickness, expose and develope the positive split image 218. The split images 218 of the type characters are the color printer for the outlined letters.

Set the dial 78 for the desired outline thickness, and tape the positive 216 in register with a film on the face plate 8 and expose and develope the film outline characters 220.

Divide the positive outline film 220 along the line 222 and register these two outlines in superposed relation to form the outlined letter and shadow film 224.

Contact print and develope a negative 226 of the split image positive of the type character and tape the positive split image 216 of the type character in register with the negative 226 and contact print to obtain the type character split image for the shadow area.

In FIGS. 44 to 48, tape the negative 135 to the film carriage 12, set the dial 78 for the inside edge of the contour line and expose and develope the plus positive film 230, contact 230 to a negative then follow the sequence of steps set forth hereinabove for FIGS. 38 to 43 using a plus negative of 230 in lieu of negative 135 to obtain the contour outline letter with outline shadow 234, the plus positive split for the contour 232, and the split image 238 for the shadow outline.

Figure 48:

The finished contour outline with original type character and outlined shadow area with split images is shown at 236 and the positive split image for the shadow area is illustrated by FIG. 48.

In FIGS. 49 to 54, tape the negative 135 to the film carriage 12, set the linear drive 22 for the desired angle and length of the shadow and expose and develope the smear positive 240. Contact print the negative 135 to obtain a positive film 242 and tape this film 242 in juxtaposed relation with the positive smear 240 on the film carriage 12, set the dial 78 at zero and expose, develope the registered negative 243, set the dial for one-half the desired inline thickness and expose and develope the split image negative 244. Contact print the negative 244 to obtain a split image positive of the type character, not shown.

Set the dial 78 for the inline thickness. Register and tape the negative 243 with a film on the face plate 8 and expose and develope the positive inlines 246.

Divide the inline positive 246 along the line 248 and superpose the inline positives of the type character to form the inlined type character and inlined shadow area 250.

In a similar manner, tape the positive of the split image of the type character to the negative 244 of the split image of the type character smear to obtain the split image 252 of the shadow area for the type character.

In FIGS. 55 through 59, tape the negative 135 to the film carriage 12 and superpose and tape a halftone screen 254, emulsion side down, over a film on the face plate 8, set the linear drive 22 for the desired angle and length of smear and expose and develope the halftone positive smear 256. With the linear drive set at the same smear angle and using a positive 257, contact printed from the negative 135, expose and develope a smear negative 258. The positive 257, when registered with the smear negative 258, forms a mask 260. Contact printing the mask 260 in register with the positive halftone smear 256 forms an air brush-like halftone type character shadow 262 in which the shadow increases in intensity adjacent the edges of the type character.

Contact and develope a negative, not shown, from the halftone positive smear 256 and contact the negative halftone smear with the mask 260 to form an air brush-like halftone type character shadow area 264 in which the shadow decreases in intensity at its limit opposite the edges of the type character.

Accurate registration of the films placed on the face plate 8 is important, particularly when two or more films are superposed thereon, however, it seems evident that other film registration means may be employed, such as punching a plurality of holes in one edge portion of the film to be registered for receiving a like plurality of registration pins on or associated with the face plate.

The above description features contiguous face to face contact between films for direct transfer to unexposed film of the image being reproduced, however, it seems obvious that the image being modified may be projected on unexposed film spaced from the apparatus to accomplish the identical results.

Figure 60:
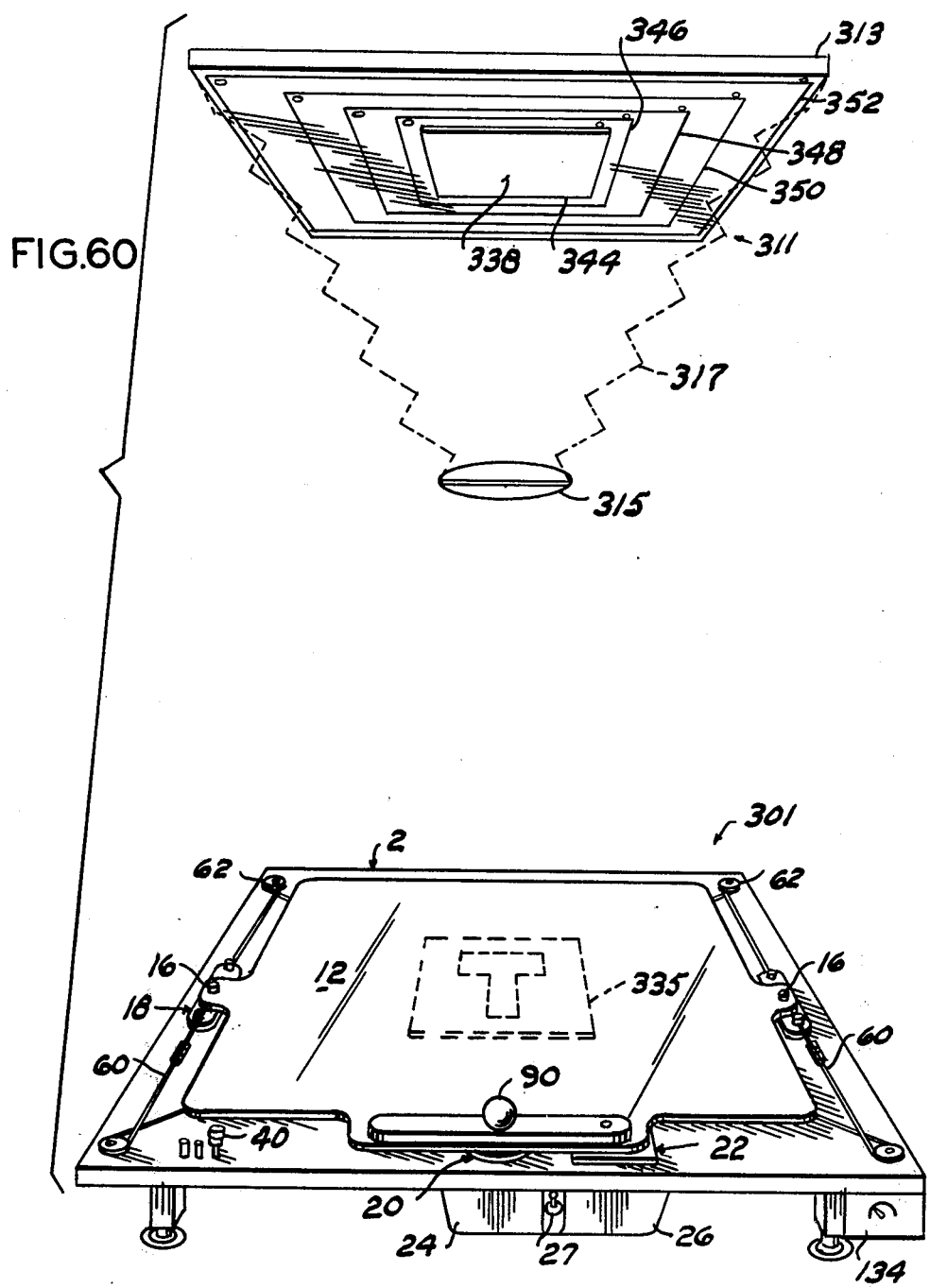

FIG. 60 illustrates the transfer of an image to be modified by a projection method. In this embodiment, the apparatus 301 is substantially identical with respect to the apparatus 1 with the exception the back copy board 10 has been removed for compactness. An image projection apparatus 311 is mounted above the apparatus 301 and includes a film locating panel 313 and a lens 315 supported by a bellows 317. The panel 313 is provided with a plurality of rectangular scored lines 344, 346, 348, 350 and 352 identically located for the placement of film thereon in the manner described hereinabove for the face plate 8 and back copy board 10 including register pins and holes for registering the film. The image containing film 335 is similarly positioned on the film carriage panel 12 so that the image is projected through the lens 315 on an unexposed film 338 supported by the camera panel 313. Thereafter, the method of operation is identical to that described hereinabove when using the eccentric motion dial guide 20 or the linear motion drive guide 22.

Obviously the invention is susceptible to changes or alterations without defeating its practicability. Therefore, I do not wish to be confined to the preferred embodiment shown in the drawings and described herein.

I claim:

1. In a graphics modifier having a planar base, a stationary film supporting face plate overlying the base and a transparent superposed film supporting carriage panel movably supported relative to the face plate and having pulley and cable means maintaining marginal edges of the carriage panel parallel with the respective marginal edges of the face plate during movement of the carriage panel, the improvement comprising: orbital and linear motion guide means mounted on said base and selectively connected with said carriage panel for moving said carriage panel in a predetermined path; and, motor means drivably connected with said motion guide means.

2. The combination according to claim 1 in which said orbital motion guide means includes: a disk rotatably overlying a marginal edge portion of said base; a dial pointer overlying said disk for relative movement toward and away from a starting position; bolt means connecting said dial pointer with said disk in off-set relation with respect to the axis of said disk for maintaining said dial pointer in a predetermined position, said dial pointer having an aperture coaxial with the axis of said disk when the dial pointer is in a starting position; and, a guide mandrel supported by said carriage panel and projecting into the dial pointer aperture.

3. The combination according to claim 1 in which said linear motion guide means includes: a centrally apertured pivot plate overlying a marginal edge portion of said base, said pivot plate having a diametric groove in its upper surface; slider means longitudinally slidable within the pivot plate groove and moved a predetermined distance from a starting position by said motor means, said slider means having a central aperture coaxial with the pivot plate when the slider means is in a starting position; and, a guide mandrel supported by said carriage panel and projecting into the slider means central aperture.

4. The combination according to claim 3 and further including: clamp means securing said pivot plate to said base for maintaining the pivot plate groove in a selected angular position relative to the marginal edges of said face plate.

5. The combination according to claim 4 in which said motor means includes a drive shaft and said slider means includes: a slider; rack means supported by said slider; and, a pinion on said drive shaft engaging said rack means.

6. The combination according to claim 3 or 5 in which said face plate is characterized by at least one pair of registration pin holes indicating at least one photosensitive sheet or film position thereon and further including: a pair of registration pins for successive registration of one or more photosensitive sheets or films.

7. The combination according to claim 1 or 2 in which said face plate is characterized by at least one pair of registration pin holes indicating at least one photosensitive sheet or film position thereon and further including: a pair of registration pins for successive registration of one or more photosensitive sheets or films.

* * * * *